(12) United States Patent
Pollack

(10) Patent No.: US 9,087,641 B2
(45) Date of Patent: Jul. 21, 2015

(54) METHOD AND SYSTEM FOR GENERATING ELECTRICAL ENERGY FROM WATER

(71) Applicant: Gerald H. Pollack, Seattle, WA (US)

(72) Inventor: Gerald H. Pollack, Seattle, WA (US)

(*) Notice: Subject to any disclaimer, the term of this patent is extended or adjusted under 35 U.S.C. 154(b) by 0 days.

(21) Appl. No.: 14/073,840

(22) Filed: Nov. 6, 2013

(65) Prior Publication Data
US 2014/0137914 A1    May 22, 2014

Related U.S. Application Data

(63) Continuation of application No. 13/235,274, filed on Sep. 26, 2011, now abandoned, which is a continuation of application No. 12/359,585, filed on Jan. 26, 2009, now abandoned.

(60) Provisional application No. 61/023,313, filed on Jan. 24, 2008.

(51) Int. Cl.
H01M 14/00 (2006.01)
H01G 9/20 (2006.01)
H01G 9/21 (2006.01)
H02S 99/00 (2014.01)

(52) U.S. Cl.
CPC ............... *H01G 9/2018* (2013.01); *H01G 9/20* (2013.01); *H01G 9/21* (2013.01); *H01M 14/00* (2013.01); *H02S 99/00* (2013.01)

(58) Field of Classification Search
CPC ................................. H01G 14/00; H01G 9/20
USPC .................................. 136/201, 205, 252, 259
See application file for complete search history.

(56) References Cited

U.S. PATENT DOCUMENTS

| | | | |
|---|---|---|---|
| 3,925,212 A | 12/1975 | Tchernev | |
| 2002/0154469 A1* | 10/2002 | Shiue et al. | 361/502 |
| 2005/0211569 A1* | 9/2005 | Botte et al. | 205/687 |
| 2009/0226798 A1 | 9/2009 | Pollack | |

OTHER PUBLICATIONS

Zheng et al., "Advances in Colloid and Interface Science," 127 (2006) pp. 19-27.
Zheng et al., "Long-range forces extending from polymer-gel surfaces," Physical Review E 68 (2003) pp. 031408-1-7.

* cited by examiner

*Primary Examiner* — Cynthia H Kelly
*Assistant Examiner* — Monique Wills
(74) *Attorney, Agent, or Firm* — Christopher A. Wiklof; Nicholas S. Bromer; Launchpad IP, Inc.

(57) ABSTRACT

Method and system for generating electrical energy from a volume of water.

30 Claims, 15 Drawing Sheets

METHOD AND SYSTEM FOR GENERATING ELECTRICAL ENERGY FROM WATER

CROSS-REFERENCE TO RELATED APPLICATION

This application claims the benefit of U.S. Provisional Patent Application No. 61/023,313, filed Jan. 24, 2008, expressly incorporated herein by reference in its entirety.

STATEMENT OF GOVERNMENT LICENSE RIGHTS

This invention was made with Government support under Contract No. AT-002362 and AR-44813 awarded by the National Institutes for Health and under Contract No. N00014-05-1-0773 awarded by the Office of Naval Research. The Government has certain rights in the invention.

BACKGROUND OF THE INVENTION

Satisfying the world's energy needs is a demanding endeavor. Presently, fossil fuels are responsible for supplying the bulk of these worldwide needs. However, fossil fuel supplies are finite, their consumption often has adverse environmental effects, their cost widely variable and somewhat unpredictable, and independence from them is long considered to be politically advantageous.

Alternative energy sources are being actively sought and developed. Solar and wind energy are attractive alternatives to fossil fuels. Wind farms have been developed and energy from them complements conventional energy supply. The promise of efficient and cost effective solar energy has yet to be realized, although considered to be a future solution to the worldwide energy problem.

Solar radiation, at its maximum produces about 1000 Watts/m$^2$. Solar cells can operate up to 30% efficiency, but typical values of efficiency for the most economical units are about 15-20%. Hence, typical output is about 200 Watts/m$^2$, or about 20,000 µW/cm$^2$ at full solar radiation. Under more typical lighting conditions, the output would be an order of magnitude lower, about 2,000 µW/cm$^2$. Typical photovoltaic output value is about 12,000 µW/cm$^2$ at full sun at the equator during the vernal equinox at midday, which is the absolute peak. More typical values, but still under bright conditions, would be an order of magnitude lower, perhaps 1,200 µW/cm$^2$. The benchmark for commercial photovoltaic cells in fairly bright light is from about 1,000 to about 2,000 µW/cm$^2$.

Despite the advances made in harnessing energy from the sun, a need exists to develop solar energy systems that provide electrical energy in an efficient and cost effective manner. The present invention seeks to fulfill this need and to provide further related advantages.

SUMMARY OF THE INVENTION

The present invention provides a method and system for generating electrical energy from a volume of water.

In one aspect, the invention provides a method for generating electrical energy from a volume of water. In one embodiment, the method includes contacting a volume of water with a hydrophilic surface and applying energy to the volume of water to provide an exclusion zone in the volume of water at the interface of the hydrophilic surface and the water, and a bulk zone in the volume of water outside of the exclusion zone; providing a first electrode in the exclusion zone and a second electrode in the bulk zone; and extracting electrical energy from the volume of water by connecting a load across the electrodes.

The applied energy can be radiant energy from the sun or infrared radiant energy from a local environment.

The method for providing electrical energy from a volume of water includes comprising connecting a load across first and second electrodes in contact with a volume of charge-separated water, wherein the volume of water is in contact with a hydrophilic surface in liquid communication with the water defining an exclusion zone at an interface of the hydrophilic surface and the water, and a bulk zone in the volume of water outside of the exclusion zone, wherein the first electrode is in the exclusion zone, and wherein the second electrode is in the bulk zone.

In another aspect of the invention, a system for generating electrical energy from a volume of water is provided. The system includes a hydrophilic material having a hydrophilic surface; a vessel for receiving the hydrophilic material and a volume of water; a first electrode positioned in the vessel proximate to the hydrophilic surface; and a second electrode positioned in the vessel distal to the hydrophilic surface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 10A:
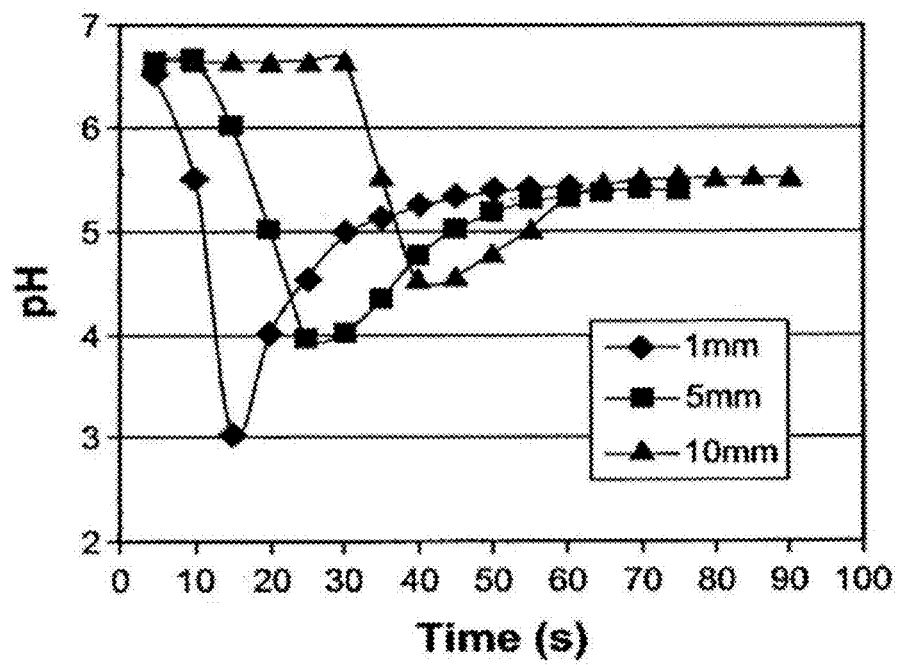
FIG. 10A is a graph comparing pH change over time following addition of water to a NAFION sheet; pH values were measured at 5 s intervals using a miniature pH probe positioned at three distances from the NAFION sheet (1 mm, 5 mm, and 10 mm); a wave of protons is generated as the exclusion zone forms providing lower pH; at a distance of 1 mm, the pH drop transiently exceeds 3 pH units, which represents a hydrogen ion increase in excess of 1,000 times.
Figure 10B:
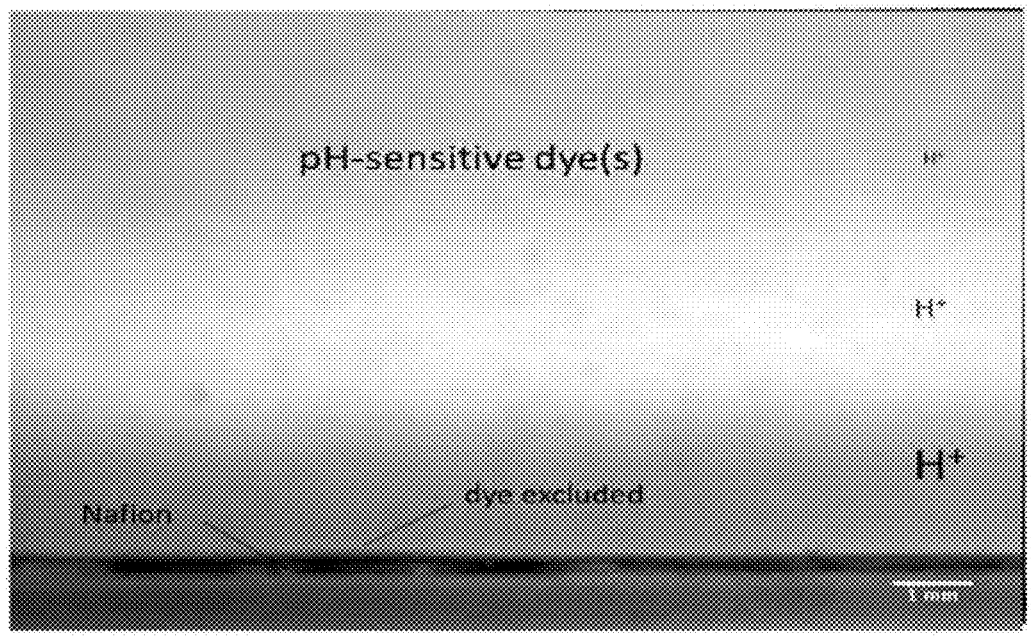
Figure 11:
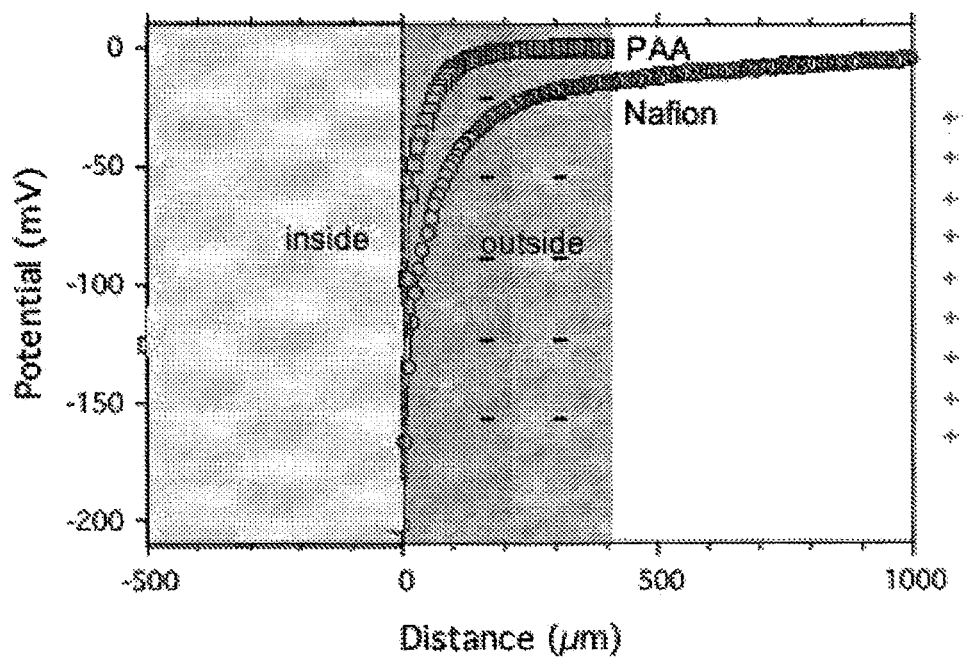

FIG. 10B is an image of a chamber containing a NAFION tube (bottom) filled with water containing pH-sensitive dye; view is normal to the wide face of a narrow chamber; image obtained 5 min after dye-containing solution was added to the tube; the dark color indicates pH<3; the lighter colors above indicate progressively higher pH levels with near neutrality at the top;

FIG. 11 is a graph comparing potential (mV) measured as a function of distance from the surface of representative hydrophilic materials (NAFION and poly(acrylic acid) gel) useful in the method of the invention; substances are depicted as "inside" and water is "outside;"

Figure 12:
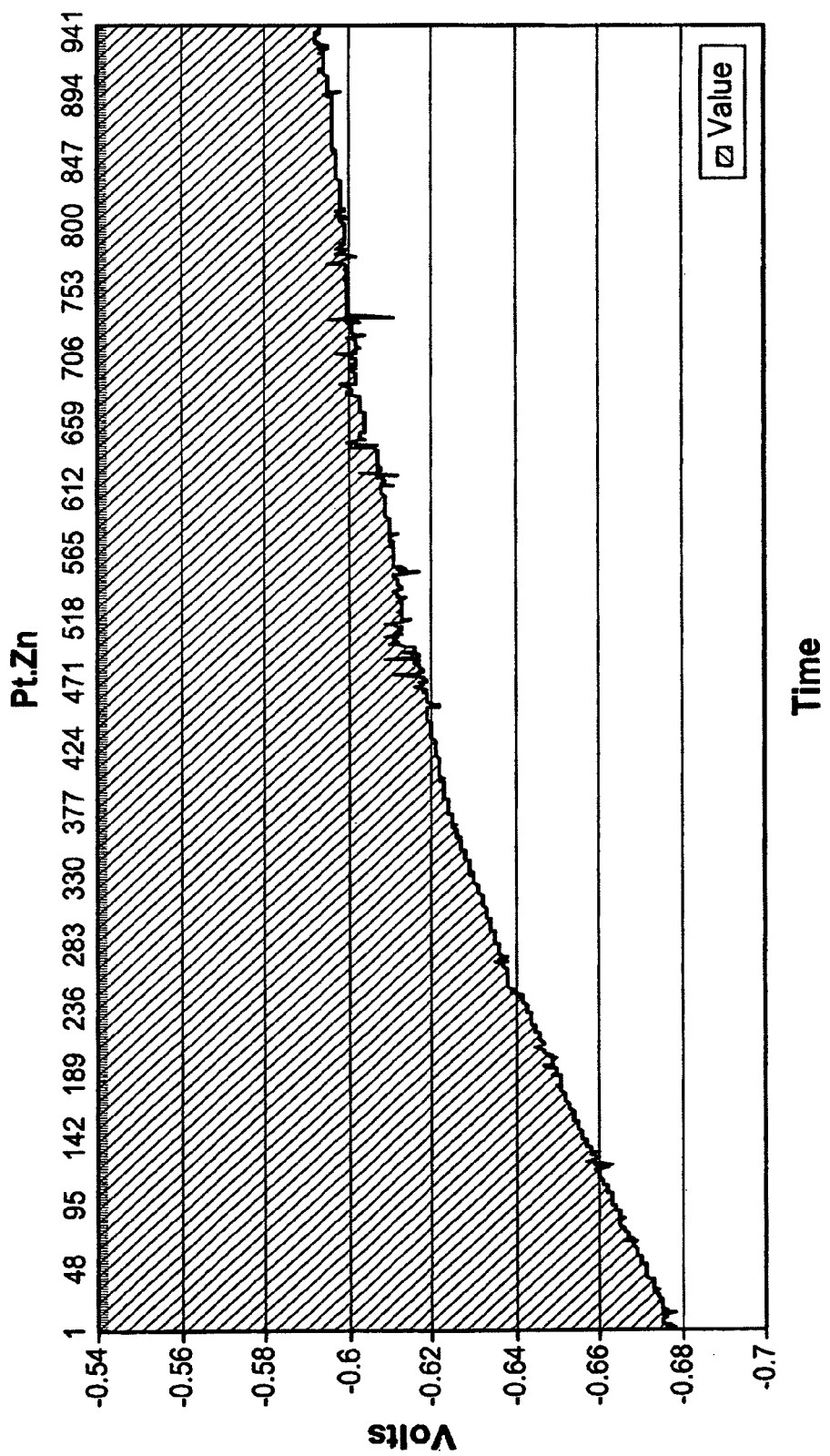
Figure 13:
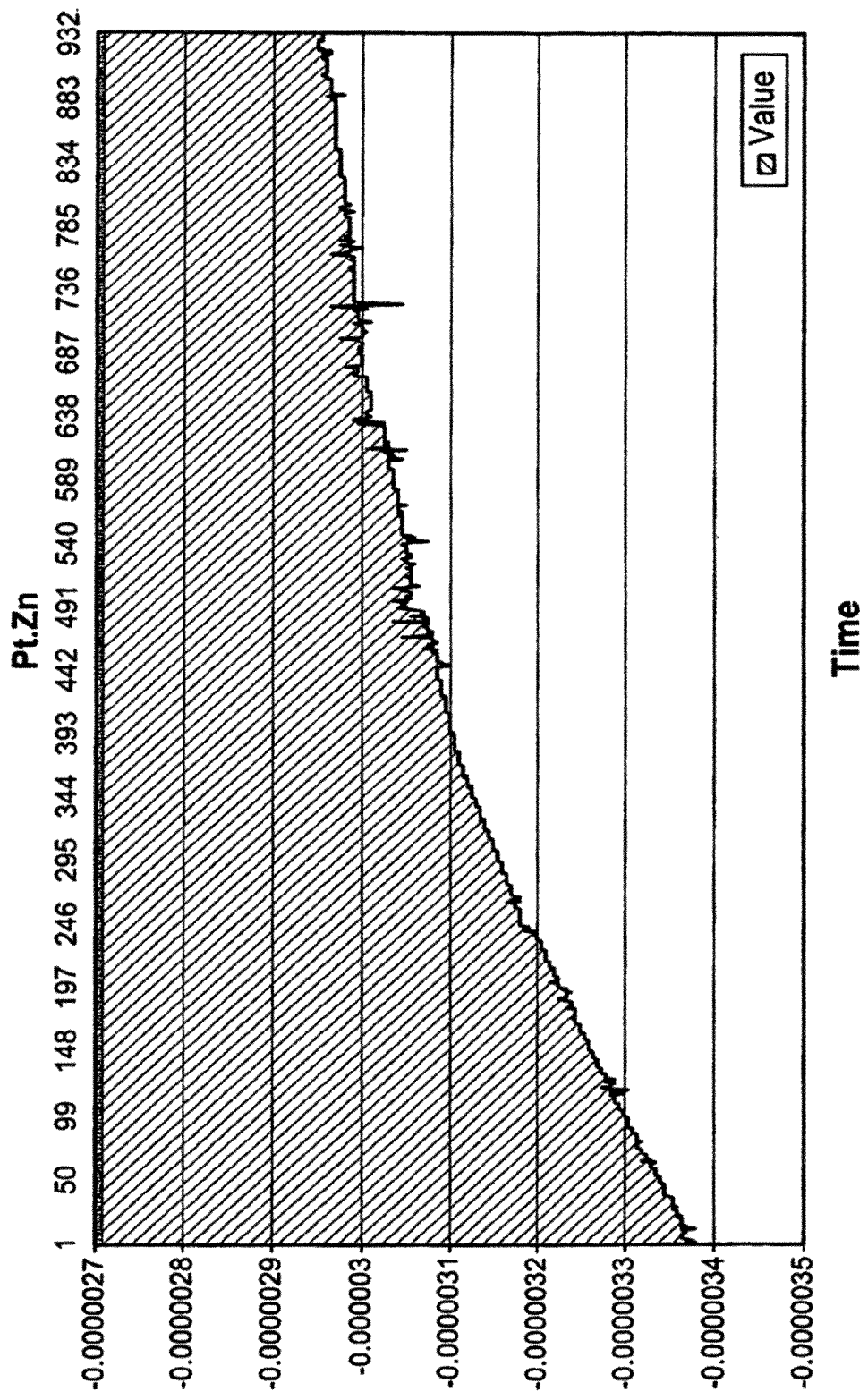
Figure 14:
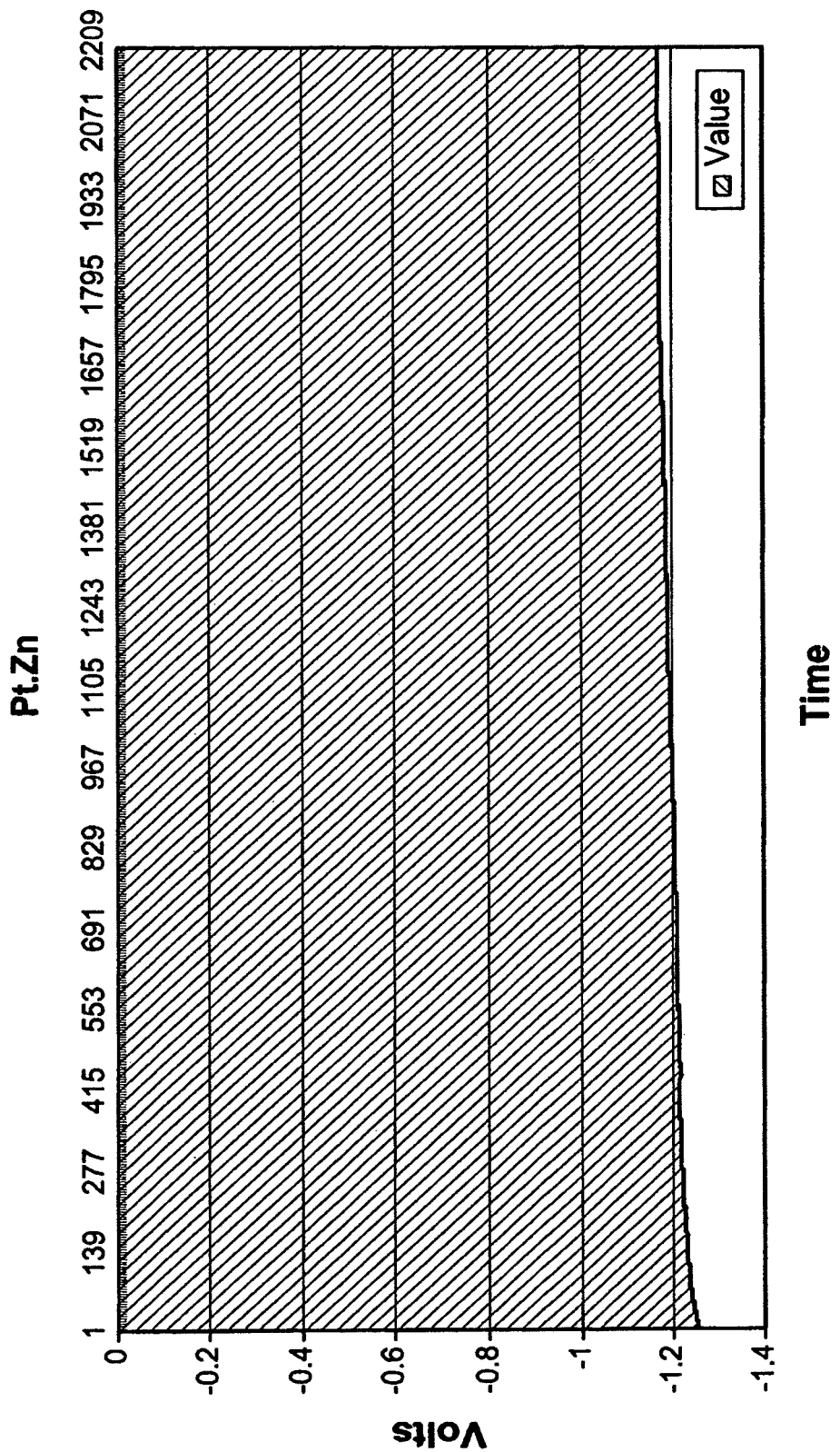
Figure 15:
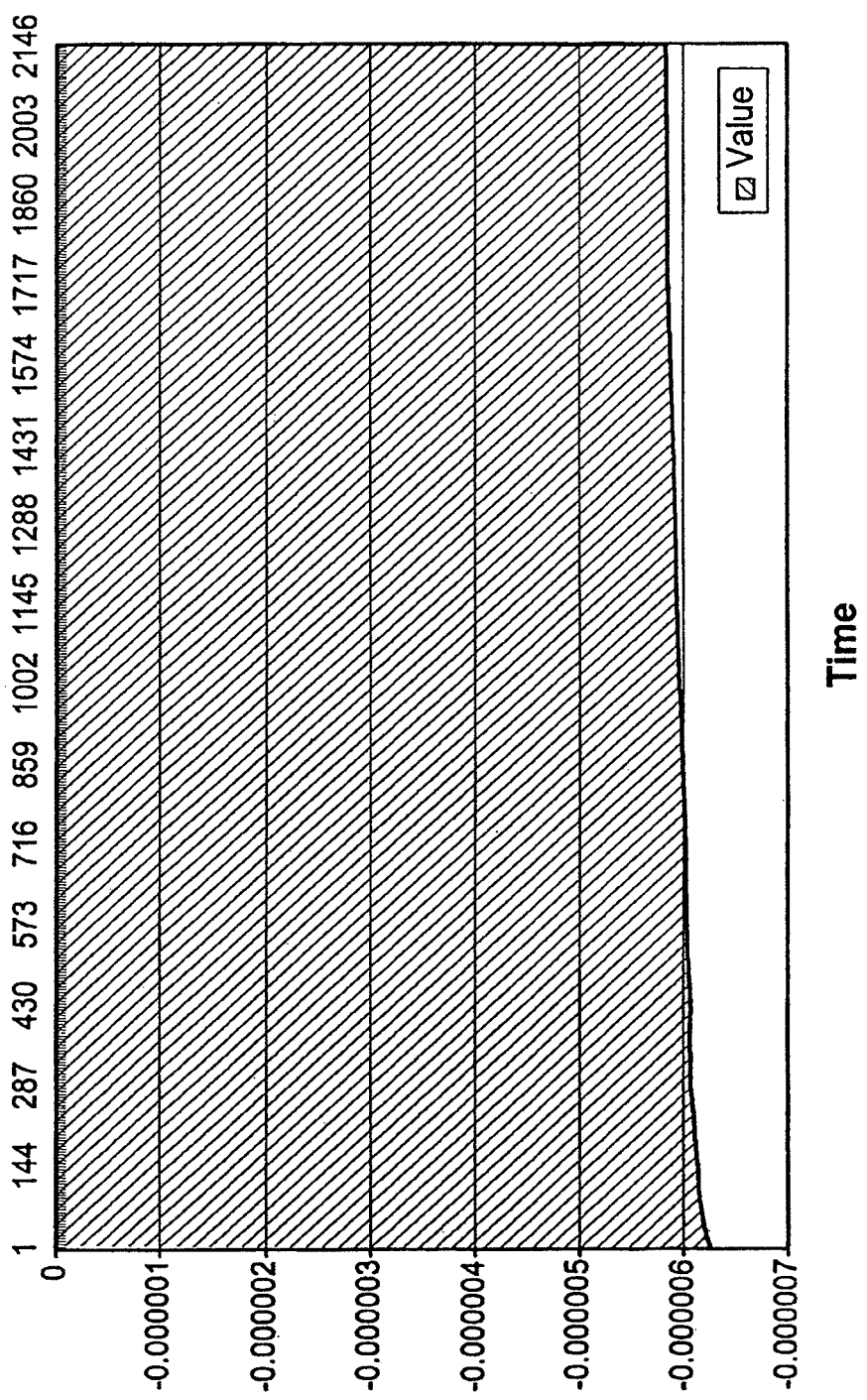

FIG. 12 is a graph of voltage (V) over time using a platinum cathode and zinc electrode;

FIG. 13 is a graph corresponding to FIG. 12 showing current (amperes) over time;

FIG. 14 is a graph of voltage (V) over time using a platinum cathode and zinc electrode using glass slides that are twice (2×) larger than those used to obtain the record shown in FIG. 12; and FIG. 15 is a graph corresponding to FIG. 14 showing current (amperes) over time.

DETAILED DESCRIPTION OF THE INVENTION

The present invention provides a method and system for generating electrical energy from a volume of water. In the method, electrical energy is extracted from the volume of water that is subject to or has been subject to applied energy, such a radiant energy from the sun or the local environment.

In one aspect, the invention provides a method for generating electrical energy from a volume of water. In one embodiment of the method, a volume of water is contacted with a hydrophilic surface and subjected to the application of energy to provide an exclusion zone at the interface of the hydrophilic surface and the water. A bulk zone in the volume of water is formed outside of the exclusion zone. Charge separation is induced in the volume of water by applying energy to the volume of water. Electrical energy is extracted from the volume of water by providing a first electrode in the exclusion zone and a second electrode in the bulk zone, and connecting a load across the electrodes.

As used herein, the term "exclusion zone" refers to a region of the volume of water created at the interface of the hydrophilic surface and the water where solutes and particles are excluded. The term "bulk zone" refers to the region of the volume of water outside the exclusion zone. The exclusion zone results from the application of energy (e.g., radiant energy) to the volume of water. The exclusion zone builds with increasing applied energy.

Application of energy to the volume of water in contact with the hydrophilic surface results in the formation of the exclusion zone. In the process, charge separation is induced in the volume of water. As used herein, the term "charge separation" refers to the physical separation of negative charges (e.g., solutes, particles, ions) from positive charges (e.g., solutes, particles, ions) in the volume of water. In general, the exclusion zone is a region of negative charge and the bulk zone is a region of positive charge (e.g., hydronium ions, free protons).

Figure 1:
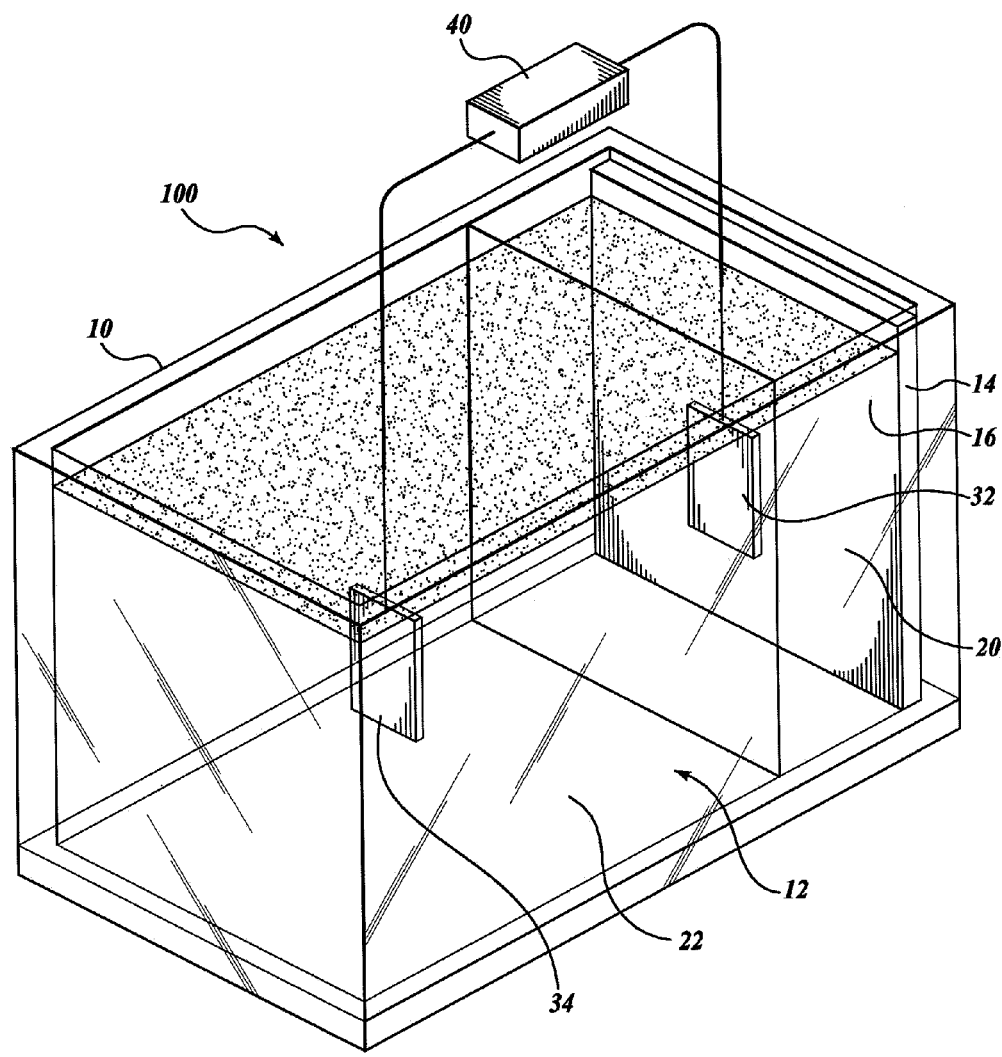
FIG. 1 is a schematic illustration of a representative system for carrying out a method of the invention.

The size and shape of the exclusion zone formed in the method of the invention varies greatly depending on the nature of the hydrophilic surface, its size and shape, the nature of the volume of water, and the energy applied. The size of the exclusion zone is variable and dependent on the applied energy: the greater the applied energy, the greater the size of the exclusion zone. The exclusion zone can extend up to a meter or more from the hydrophilic surface. The exclusion zone can therefore extend from the hydrophilic surface any distance from about 1 nm to a meter or more. In certain embodiments, the exclusion zone can extend a distance of from one to two millimeters from the hydrophilic surface. In other embodiments, the exclusion zone can extend a distance of from about 200 μm to about 700 μm from the hydrophilic surface. The shape of the exclusion zone is also variable. For example, when the hydrophilic surface is a sheet positioned against a wall of the vessel containing the volume of water, the exclusion zone extends into the volume of water away from the surface of the hydrophilic surface. When a sheet of material having two hydrophilic surfaces is placed in a volume of water, the exclusion zone extends into the volume of water away from each surface. For a sphere of hydrophilic material having a hydrophilic surface, the exclusion zone extends radially into the volume of water away from the sphere (e.g., shell). In other embodiments, the exclusion zone extends into the volume of water non-uniformly. For examples, the exclusion zone can have the form of a cone narrowing into the volume of water. Exclusion zones having a plurality of cones extending into the volume of water have also been observed. Schematic illustration of the volume of water having exclusion and bulk zones is shown in FIG. 1.

Exclusion zones were not observed with materials having hydrophobic surfaces, such as silicon rubber, nylon, carbon, quartz, and a plastic paraffin film (PARAFILM®, is a registered trademark of Bemis Co. INC. OF Neenah, Wis.), hereinafter referred to as "PARAFILM". In general, the materials having surfaces that are highly charged (e.g., sulfonated tetrafluoroethylene copolymer (NAFION 117 polymer), polyacrylic acid gels) exhibit the largest exclusion zones, while those that are least charged (e.g., polyvinyl alcohol gels) exhibit the smallest exclusion zones. (NAFION®, hereinafter referred to as "NAFION" is a registered trademark of E.I. Du Pont De Nemours and Company Corporation of Wilmington, Del.) In all cases, the region beyond the exclusion zone had net positive charge, confirmed by measurements of pH, which showed low pH and therefore high hydrogen ion concentration. In some experiments the pH was as much as four units lower than the original water pH. However, the situation is reversed in the case of positively charged surfaces. These included positively functionalized polystyrene gel beads, and SELEMION® positively functionalized ion exchange resin (SELEMION®, hereinafter referred to as "SELEMION" is a registered trademark of AGC Engineering Co., LTD. of Chiba, Japan). In such cases the potential was 100-200 mV positive at the surface, declining to zero at the edge of the exclusion zone. The bulk water beyond had high pH instead of low pH. In these cases of positively charged surfaces, the exclusion zones were found to be smaller and somewhat more ephemeral than those next to the negatively charged surfaces.

The volume of water required for the method of the invention is not critical. The method is applicable to nanoscale volumes of water and to expansive volumes of water (e.g., lakes and oceans). The pH of the volume of water can vary (e.g., from about 2 to about 11). It has been observed that relatively more electrical energy can be obtained by the method at low pH (e.g., pH>about 4). The volume of water can include solutes such as salts. Suitable salts include potassium chloride and sodium chloride. Other salts, such as those used in chemical batteries can also be used. The ionic strength of the volume of water can also vary. Ionic strengths up to about 5M have provided reasonable output. Electrical energy has been extracted from volumes of water having ionic strength up to about 5M, and optimal energy has been obtained at ionic strengths from about 100 mM to about 2M.

In the method, the exclusion zone is formed adjacent to the hydrophilic surface. As used herein, the term "hydrophilic surface" refers to a surface of a material having a contact angle less than 90 degrees for water. The hydrophilic surfaces may be charged or uncharged. The charged hydrophilic surfaces may be mixed charge surfaces. The charged hydrophilic surfaces may have a net positive charge or a net negative charge.

Suitable materials having hydrophilic surfaces include hydrophilic gels (e.g., polyacrylic acid gels, polyvinyl alcohol gels, polyacrylamide gels, polyHEMA gels, collagen gels, actin gels, and agarose gels), biological materials (e.g., muscle tissue, vascular endothelium, xylem, oxtail tendon, seaweed, and plant root), self-assembled monolayers including carboxyl group-containing monolayers and polyethylene glycol-containing monolayers (e.g., supported on metal surfaces such as gold), polymeric surfaces (e.g., ionomer surfaces) including sulfonic acid-containing polymer surfaces (e.g., sulfonated tetrafluoroethylene copolymer surface also known as NAFION), inorganic surfaces (e.g., surfaces containing titanium dioxide, silicon, zinc, lead, tungsten, aluminum, tin, and mica), and ion exchange resins and materials.

As noted above, suitable materials having hydrophilic surfaces may have a variety of shapes. In one embodiment, the hydrophilic material is a sheet having a rectangular hydrophilic surface. In another embodiment, the hydrophilic material is a particle (e.g., microsphere or nanosphere). In other embodiments, the hydrophilic material includes a plurality of hydrophilic beads (e.g., mixed charged beads, negatively charged beads, positively charged beads).

In one embodiment, the hydrophilic material is ice. Exclusions zones have been observed for each of the hydrophilic materials noted above.

As noted above, in the method, a volume of water is contacted with a hydrophilic surface and subjected to the application of energy. Application of energy increases the size of the exclusion zone. In one embodiment, applying energy includes irradiating the volume of water with electromagnetic radiation. Suitable electromagnetic radiation includes radiation absorbed by the volume of water (e.g., wavelengths in the range from about 200 nm to about 10,000 nm). In the method, infrared wavelengths are the most effective wavelengths. In one embodiment, the radiant energy has a wavelength of about 3 μm.

The applied energy can be radiant energy from the environment such as solar energy (e.g., ultraviolet, visible, near infrared, and infrared radiation) and heat from the local environment (infrared radiation).

Although radiant energy is the source of energy applied to the volume of water, in one embodiment of the method, the size of the exclusion zone can be increased by applying a voltage across the electrodes.

In the method, electrical energy is extracted from the charge-separated volume of water by connecting a load across the first and second electrodes. The nature of the electrodes is not particularly critical. Suitable electrodes include platinum, zinc, aluminum, stainless steel, and copper electrodes. The first and second electrodes may the same or different.

The load can be connected after a predetermined period of time after inducing charge separation (i.e., after applying energy to the volume of water). Alternatively, the load can be connected during application of energy (e.g., applying radiant energy to the volume of water) in which case electrical energy is extracted from the volume of water at the same time that energy is applied to the volume of water.

Thus, in one embodiment of the method, electrical energy is extracted from a volume of water by connecting a load across first and second electrodes in contact with a volume of charge-separated water, wherein the volume of water comprises a hydrophilic surface in liquid communication with the water defining an exclusion zone at an interface of the hydrophilic surface and the water, and a bulk zone in the volume of water outside of the exclusion zone, wherein the first electrode is in the exclusion zone, and wherein the second electrode is in the bulk zone. As noted above, "charge-separated water" refers to water in contact with a hydrophilic surface that initiates the formation of the exclusion zone having a net charge opposite that of the bulk zone.

In another aspect of the invention, a system for extracting electrical energy from a volume of water is provided. In one embodiment, the system includes a hydrophilic material having a hydrophilic surface, a vessel for receiving a hydrophilic surface and a volume of water; a first electrode positioned proximate to the hydrophilic surface; and a second electrode positioned distal to the hydrophilic surface. When the vessel has received a volume of water and energy has been applied to the volume of water, the first electrode is positioned in an exclusion zone formed at the interface of the hydrophilic surface and the water, and the second electrode is positioned in a bulk zone in the volume of water outside of the exclusion zone.

In one embodiment, the system includes only those components described above (i.e., the system consists of the noted components). In another embodiment, the system includes those components described above and other components that do not alter the characteristics of the system (i.e., the system consists essentially of the noted components). Components that are excluded from this embodiment include components and conditions used in methods for the electrolysis of water, methods for analyzing water samples, and electrochemical analytical and synthetic methods carried out in water.

FIG. 1 is a schematic illustration of a representative system for carrying out the method of the invention. Referring to FIG. 1, system 100 includes vessel 10 that contains volume of water 12 and hydrophilic material 14 having hydrophilic surface 16. On application of energy (e.g., radiant energy), exclusion zone 20 and bulk zone 22 form in volume of water 12. Electrode 32 is positioned in the exclusion zone and electrode 34 is positioned in the bulk zone. Electrical energy is extracted from the volume of water by applying a load 40 across electrodes 32 and 34. Absent continued application of applied energy, the exclusion zone contracts. Application of energy during the application of a load allows for maintenance of the exclusion zone (i.e., charge separation) and simultaneous extraction of electrical energy. The following provides a further describes the method of the invention. Unexpected phenomenon was observed in water next to hydrophilic surfaces. In a zone up to several hundred micrometers from the hydrophilic surface, solutes were excluded. Subsequent studies showed that the solute-excluding region was physico-chemically different from ordinary water, and probably liquid crystalline. Qualitative differences between this vicinal water and the bulk water farther from the hydrophilic surface were demonstrated using NMR, infrared radiation, and UV-Vis optical absorption. An additional unexpected result was also observed: the excluding region was negatively charged. The potential difference between the vicinal water and water remote was approximately 200 mV, decreasing exponentially with distance from the surface, toward zero potential difference at the end of the exclusion zone.

The results indicate a loss of positive charge from otherwise neutral water. This lost positive charge was determined to reside in the aqueous zone beyond the exclusion zone. Methods showed a large proton concentration in this bulk region. In dynamic experiments with pH probes, a wave of protons was detected flowing away from the vicinal water and toward the more distant bulk water, as the exclusion zone was growing. The result is charge separation in the water.

When an entity whose surface is hydrophilic is placed into water, ordering of water molecules next to the surface immediately begins. The ordered entity is negative. As this zone builds, the quantity of negative charge builds. Meanwhile, the complementary positive charges build in the zone beyond this ordered zone to provide charge separation. The charge separation is sustained. In the method of the invention, electrical current is drawn and thereby useful work obtained from charge-separated water.

In the method of the invention, the buildup of water structure, and hence the separation of charge, is powered by incident radiant energy (i.e., photons). In an experiment, a chamber lined on one side with a hydrophilic surface (i.e., NAFION) was filled with an aqueous suspension of polystyrene microspheres. Within several minutes the microspheres moved away from the surface leaving an exclusion zone. This zone generally remained stable for hours. When light was added the exclusion zone immediately began growing, and within five minutes it had grown substantially. When the light source was extinguished, the exclusion zone returned to its initial size. The effect of incident light is reversible.

Figure 2A:
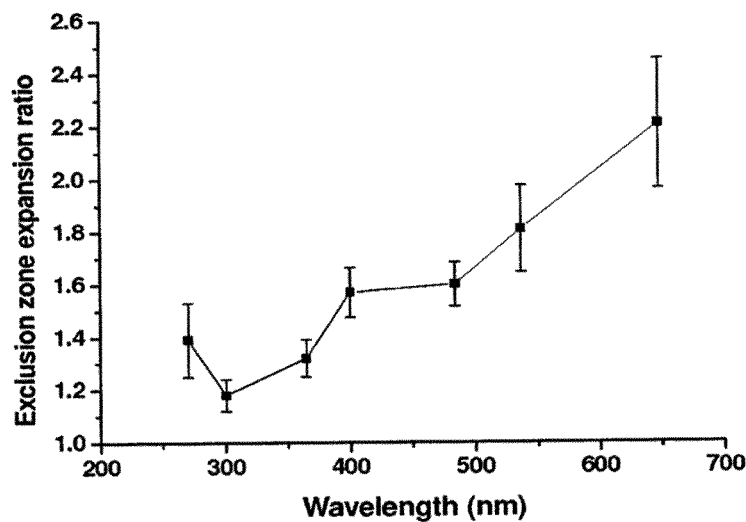
FIGS. 2A and 2B are graphs comparing the exclusion zone expansion ratio as a function of wavelength of applied energy; 2A UV-Vis, 2B IR.
Figure 2B:
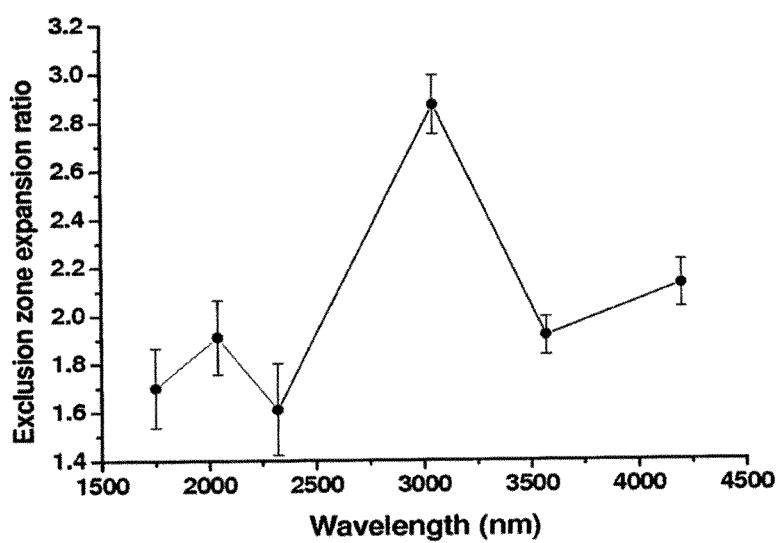

Growth of the exclusion zone was wavelength sensitive. FIGS. 2A and 2B are graphs comparing exclusion zone expansion ratio (defined as the ratio of the exclusion zone width after application of energy to the control state, which is the width of the exclusion zone prior to the application of energy) as a function of wavelength (2A UV-Vis and 2B IR). Throughout the ultraviolet-visible range the intensity was maintained constant; and, the same throughout the infrared range (on the order of 100 µW). In the latter series, intensities were lower than in the former series. All wavelengths increased the size of the negative zone, and the increase was wavelength sensitive. The most powerful effect occurred at a wavelength of 3 µm. With mode intensity (271 µW) at 3 µm, in five minutes the exclusion zone (EZ) increased by almost a factor of three.

It is noteworthy that 3 µm is the wavelength most strongly absorbed by water, and it causes heating. The temperature increase was measured at various points in the chamber. During the five-minute exposure, in no instance did the temperature increase exceed 1° C. demonstrating that any effect of heating must have been secondary. The major impact of these photons appears to be non-thermal, although the exact mechanism (i.e., how the photonic energy brings about ordering of exclusion zone water and charge separation) remains unclear.

The following experiments determined that electrical power can be drawn from the charge-separated water. The setup included a NAFION sheet, secured within a sandwich of plastic sheets each containing a large open window, so that the NAFION sheet was exposed to water. A stainless steel-mesh electrode was placed immediately adjacent to the exposed NAFION sheet on one side. This served as the negative electrode. The positive electrode, another stainless steel mesh, was placed some distance from the sheet, either on the same, or the opposite side as the negative electrode. The second electrode was positioned so as to lie beyond the exclusion zone. The entire assembly was immersed in water. The two electrodes were either left open circuited, for potential difference measurements, or connected by a load resistor, arbitrarily chosen at 10 Kohms, through which current could flow.

Figure 3:
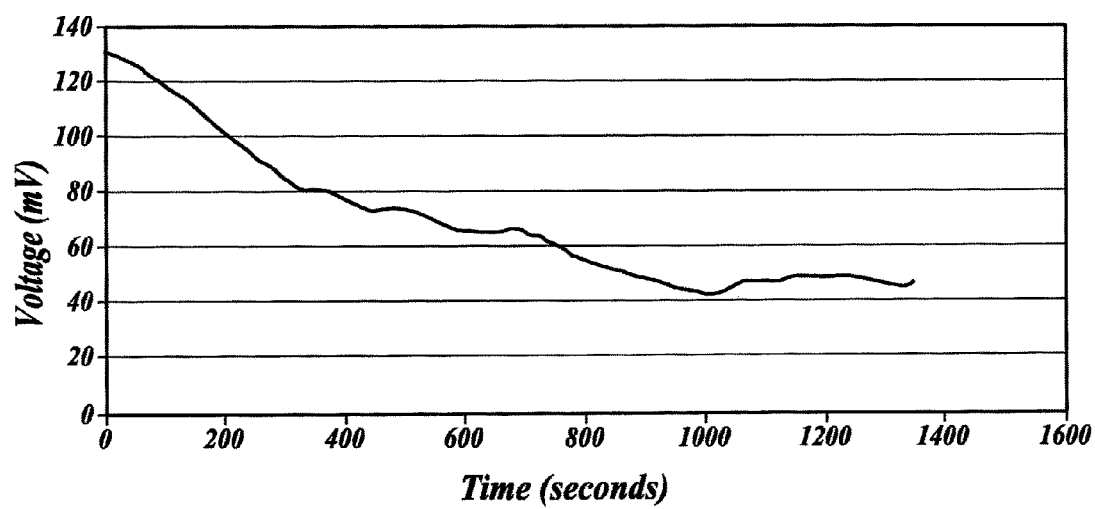
FIG. 3 is a graph illustrating voltage decrease over time in an open circuit with no infrared irradiation.
Figure 4:
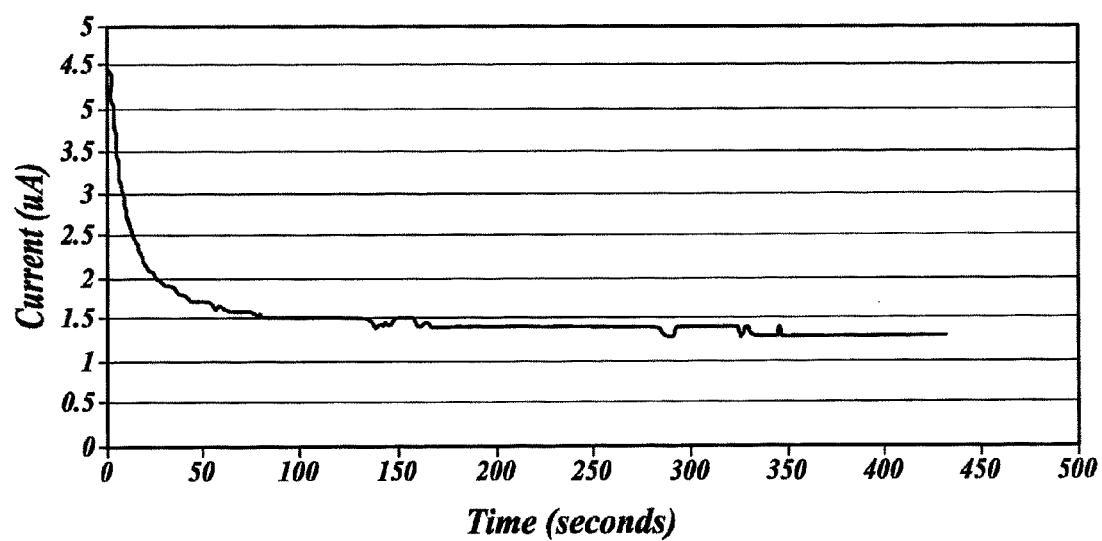
FIG. 4 is a graph illustrating current over time in a closed circuit with a 10K resistor.

A potential difference on the order of 100-200 mV was typically recorded. The voltage was high at first, but generally declined with time, depending on whether the load resistor was or was not attached. Importantly, the voltage never fell to zero. A fraction of the initial voltage persisted indefinitely, implying that energy was consistently flowing into the system to recharge the system (infrared energy was continuously available to power the system). FIG. 3 is a graph illustrating voltage decrease over time in an open circuit with no infrared irradiation. FIG. 4 is a graph illustrating current over time in a closed circuit with a 10K resistor.

Figure 5:
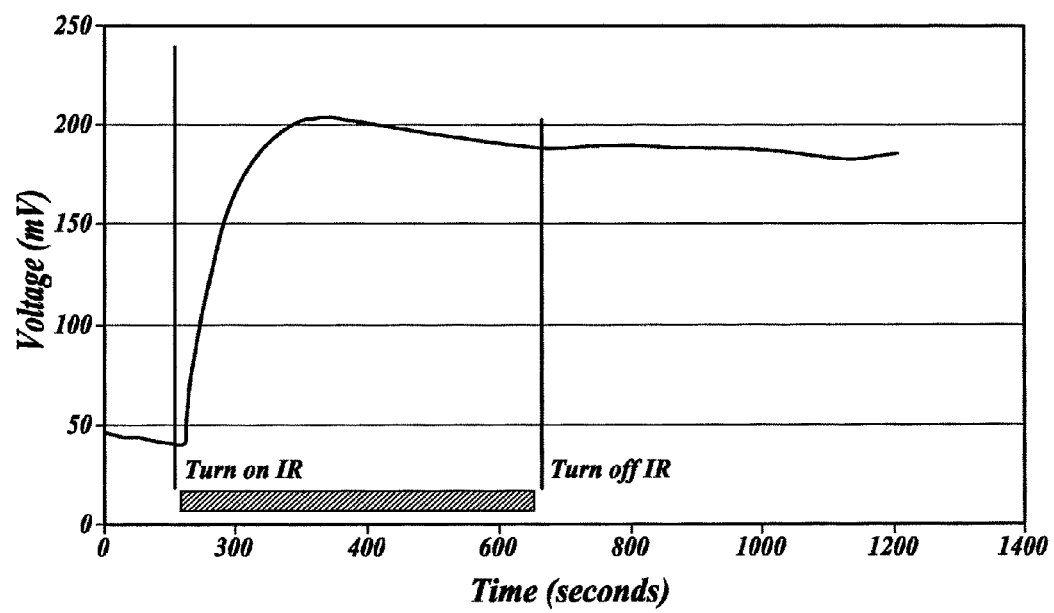
FIG. 5 is a graph illustrating voltage over time in an open circuit with infrared radiation.

Experiments were then undertaken to demonstrate that incident infrared illumination increases power output in the system. FIG. 5 is a graph illustrating voltage over time in an open circuit with infrared irradiation. This data was obtained after the voltage had already diminished considerably from an initial value. Turning on the light caused an immediate (within several minutes) return to the initial (200 mV) voltage, which was sustained even for some time after the light had been turned off.

Figure 6:
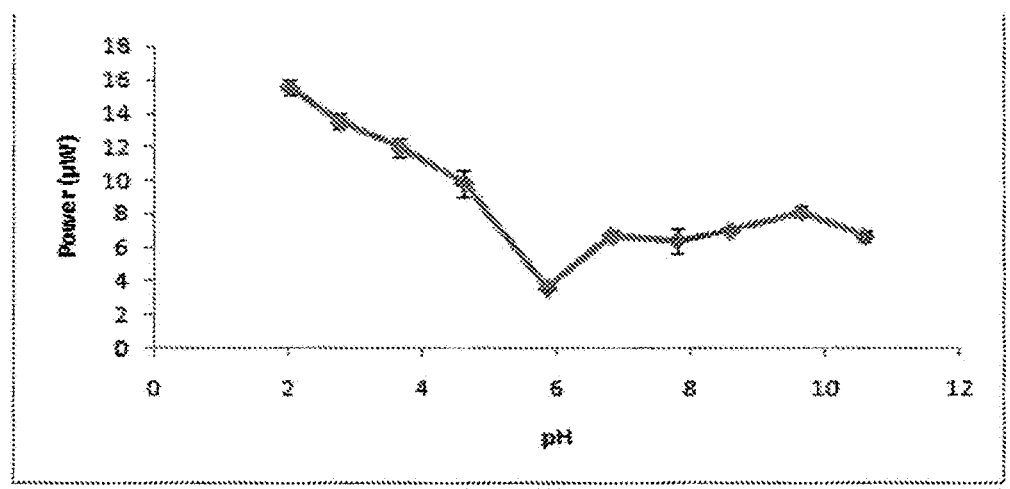
FIG. 6 is a graph showing power generated as a function of pH.

Lowering the pH of the volume of water tended to increase power as indicated in FIG. 6. Adding salt to the volume of water induces a substantial positive effect on power production, probably because of the increased conductivity of the solution. Potassium chloride and sodium chloride exert similar effects. In the concentration range 0.1 M to 1 M, power output increased to 150 microwatts. Considering the electrode-surface areas of approximately 3 $cm^2$, this increase amounts to about 50 $\mu W/cm^2$.

Figure 7A:
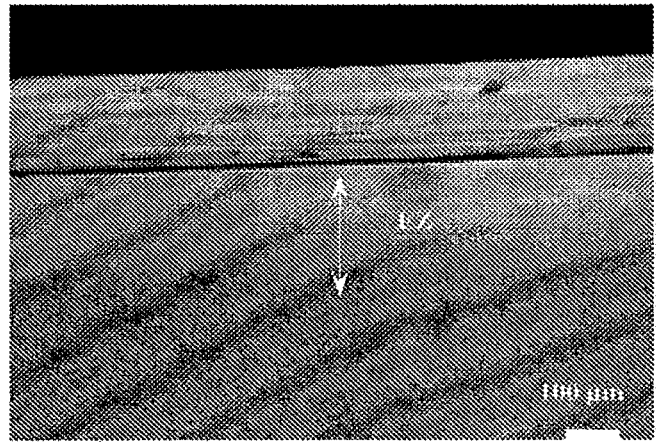
FIG. 7A is an image of an exclusion zone prior to exposure to infrared radiation, the exclusion zone (EZ) is denoted by the absence of microspheres.
Figure 7B:
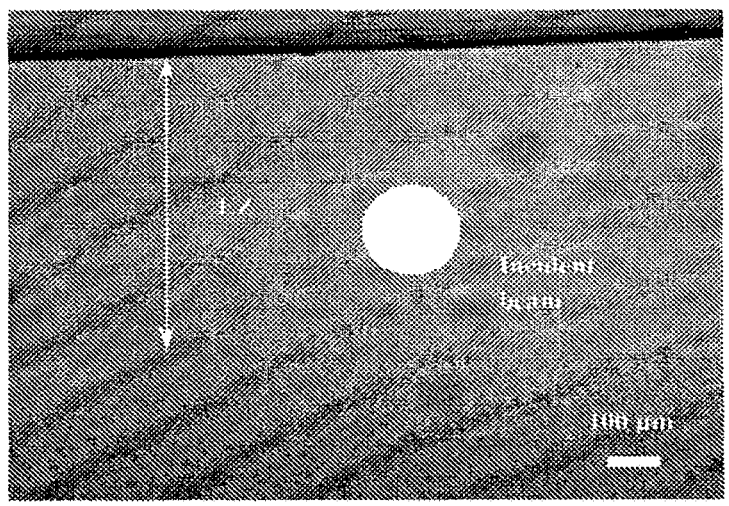
FIG. 7B is an image of the exclusion zone after 5 min exposure to light from LED31-PR; approximate size of incident beam is shown.

Examples of exclusion zones are illustrated in FIGS. 7A and 7B. Referring to FIGS. 7A and 7B, the exclusion zones are adjacent nucleating surfaces and are denoted by the absence of microspheres. As noted above, the exclusion zone is distinct from bulk water. A series of measurements including UV-Vis absorption spectra, infrared and NMR imaging, and electrical polarization showed that water in the exclusion zone was less mobile and more ordered than bulk water, and that it was charged.

Water is known to have a strong absorption peak at a wavelength 3.05-3.10 µm, corresponding to a symmetric OH stretch. A light source, LED31-PR, which has peak output at 3.1 µm and full width at half maximum (FWHM) of 0.55 µm, was used to irradiate water in contact with a hydrophilic surface. PERMA PURE® NAFION tubing (TT-050, 0.042 in. diam., (PERMA PURE® is a registered trademark of PERMA PURE LLC of Cincinnati, Ohio) was suffused with a 1 µm carboxylate-microsphere suspension (2.65% solids-latex, available from Polysciences Inc. of Warrington, Pa.) with a 1:500 volume fraction, to a depth of about 1 µm. The chamber was made using a thin cover glass adhered to the bottom of a 1-mm thick cover slide with a 9-mm circular hole cut in the center, and was placed on the stage of a microscope (ZEISS AXIOVERT-35, with camera CFW-1310C). (ZEISS® and AXIOVERT® are registered trademarks of Carl Zeiss AG Corp. of Oberkochen, Germany.) A pinhole (available from Edmund Optics of Barrington, N.J.), 50 µm in diameter and 0.25 mm thick, was used to obtain an incident beam of restricted diameter. A fabricated holder integrated the pinhole and LED into a single unit with the LED mounted close to the pinhole. The LED-pinhole axis was vertically oriented.

When the exclusion zone reached an apparent equilibrium state, the incident radiation was turned on. Optical power output was 33 µW, and the estimated power received through the pinhole was about 2.4 nW. After five minutes, the LED assembly was removed and the exclusion zone was photographed through the microscope. Referring to FIGS. 7A and 7B, it is apparent that even with modest IR exposure, the exclusion zone (7B) grew to approximately three times its control size (7B).

Exclusion zone width was also tracked over time. This was carried out not only with the 3.1 µm source, but also with 2.0 µm and 1.75 µm sources (FWHM=0.16 µm and 0.18 µm, respectively). For the latter two sources, intensities were maintained at approximately 190 µW; but for the 3.1 µm source, power was kept at the maximally attainable value, 33 µW.

Figure 8A:
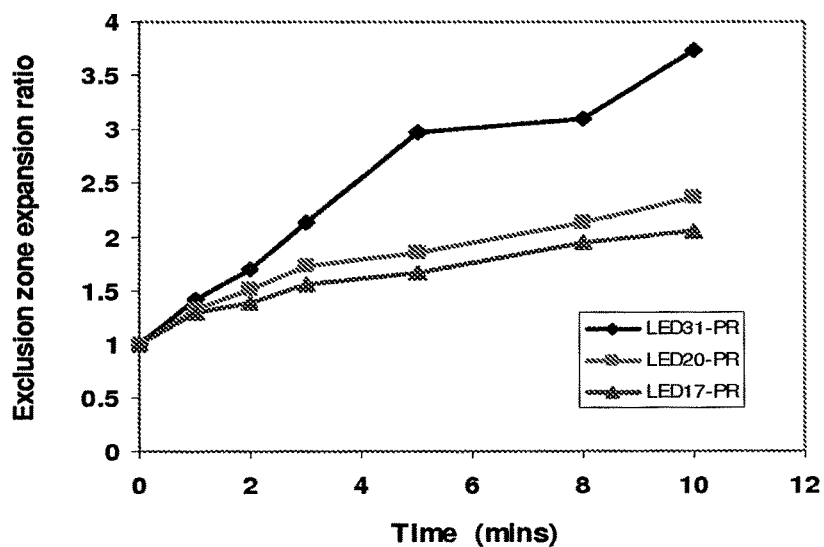
FIG. 8A is a graph comparing exclusion zone expansion ratios as a function of exposure time for three infrared sources (LED17-PR, LED20-PR. and LED31-PR, lower power for LED31-PR)

During the 10 min exposure at all three wavelengths, exclusion zones continued to expand approximately linearly (FIG. 8A). The largest effect was seen at 3.1 µm, despite lower incident power. To determine whether the EZ continues to expand beyond the 10-min exposure, the 3.1 µm source was left on at the same intensity as above for up to one hour. The ratios increased from 3.7±0.10 (10 min) to 4.7±0.12 (30 min) and 6.1±0.17 (1 hr) respectively. Hence, the exclusion zone continued to expand for up to at least one-hour of exposure.

Post-illumination exclusion zone size dynamics were examined. When the infrared light was turned off after 5 minutes exposure, exclusion zone width remained roughly constant with fluctuations for about 30 min. Then, the size of the exclusion zone began decreasing noticeably and continued to decrease for approximately one hour.

Figure 8B:
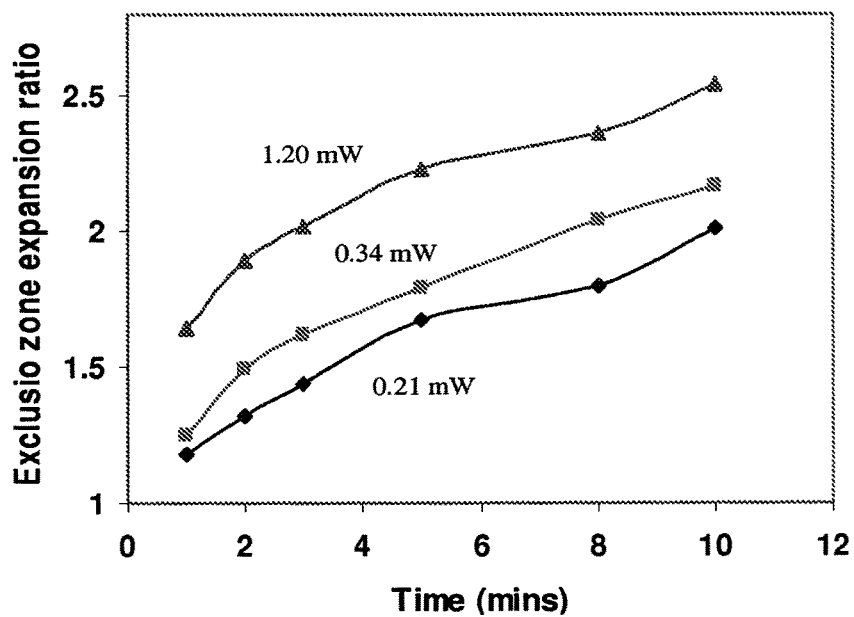
FIG. 8B is a graph comparing exclusion zone expansion ratios as function of time during 10 min exposure at different intensities (0.21 mW, 0.34 mW, and 1.20 mW) using LED20-PR.

To determine the effect of beam intensity on exclusion zone expansion, the 2 µm source was employed at three power levels, 0.21, 0.34, and 1.20 mW. The rate of EZ expansion increased with an increase of incident power (FIG. 8B).

The results demonstrate that exclusion zone expansion is a function of both time and intensity. Exclusion zone growth depends on the cumulative amount of incident energy.

To test whether the expansion arises out of some unanticipated interaction between the incident radiation and the particular type of microsphere probe, microspheres of different size and composition were tested. For carboxylate microspheres of diameters 0.5 µm, 1 µm, 2 µm, and 4.5 µm at the same volume concentrations (1:500), mean expansion ratios for 5-min exposure of 3.1 µm radiation were: 2.41, 2.97, 3.08, and 3.34, respectively (n=6). For varied 1 µm microspheres made of carboxylate, sulfate (2.65% solids-latex, available from Polysciences Inc. of Warrington, Pa.), and silica ($SiO_2$, available from Polysciences Inc. of Warrington, Pa.) under conditions the same as above, expansion ratios were 2.97, 3.10 and 1.50. Some material-based and size-based variations were noted; the latter arising possibly because of different numbers of particles per unit volume; but, appreciable radiation-induced expansion was nevertheless seen under all circumstances and with all materials. The presence of the expansion effect is not material specific.

The effect of illuminating with IR at different positions relative to the NAFION/water interface was compared. For these measurements, a sheet of NAFION 117 film (0.007 in. thick, Aldrich), approximately 6 mm long and 1.5 mm high, was held by a micro-clip (0.75×4-mm jaws, World Precision Instruments) and positioned in the vertical plane near the middle of the chamber, which was made from a rectangular glass block, length 7 cm, width 2.5 cm and height 1.5 mm with a rectangular hole, length 3.15 cm and width 1.2 cm, cut through from top to bottom and a 1-mm-thick glass slide sealing from beneath. The film's upper edge was positioned at the solution surface. The vertical scale was carefully calibrated using a 1-mm-thick glass slide with face markings; one millimeter corresponded to 634 divisions on the focus knob. A 50 µm pinhole was placed immediately above the specimen in order to restrict incident spot size. To estimate spot diameter at different solution depths, a visible source (microscope light with green filter, $\lambda$=550 nm) was substituted for the LED. Beam diameters increased approximately linearly from 160 µm at the solution surface, to 240 µm at 1.5 mm below the surface (these values are only approximate, as diameters will change with wavelength). For periods of observation and data collection, where some illumination was required, intensity was minimized by use of this same filter.

Figure 9A:
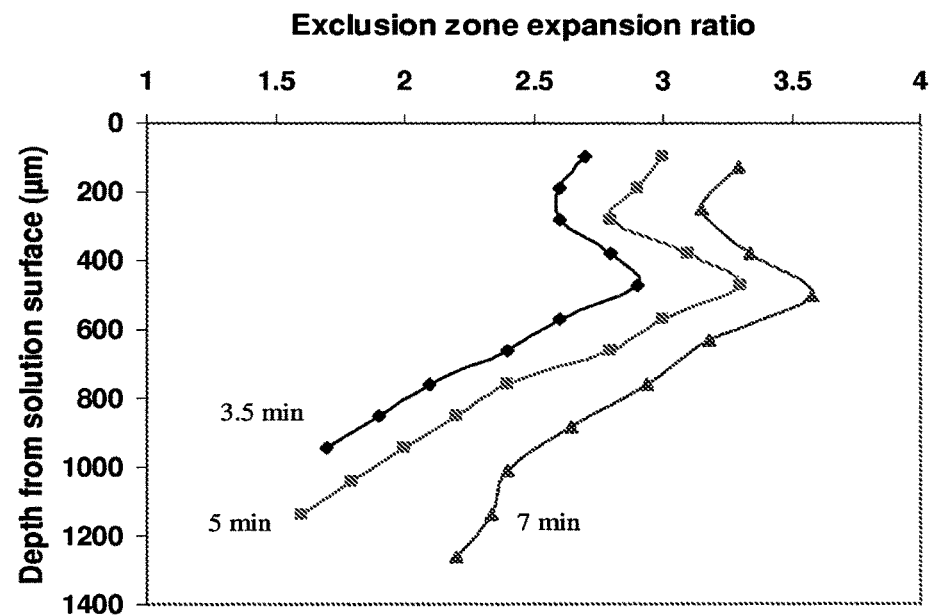
FIG. 9A is a graph comparing exclusion zone expansion ratios at different depths during 3.5 min, 5 min, and 7 min exposures of 3.1 µm radiation.

With the beam first positioned in the middle of the exclusion zone, the expansion ratios were measured at different depths. FIG. 9A shows that maximum expansion occurred at a depth of approximately 450 µm from the solution surface, and was detectable well beyond 1 mm. The fact that the maximum expansion occurred well below the surface is surprising given the limited IR penetration ordinarily expected in water.

Figure 9B:
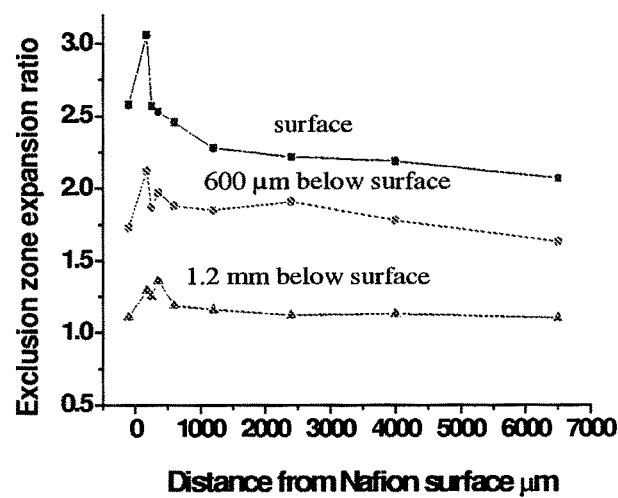
FIG. 9B is a graph comparing exclusion zone expansion ratios with 5 min exposure to 3.1 11 m radiation focused at a series of distances from a NAFION® surface.

With the same setup as above, the spot was then positioned at varying distances from the NAFION-water interface. Results are shown in FIG. 9B. Expansion was largest when light was focused in the center of the exclusion zone, and fell off on either side, although not appreciably. At deeper positions, the near-NAFION expansion peak tended to broaden somewhat, possibly because of incident-beam broadening; but, the trend was essentially similar at all depths. The most notable finding was that even when the beam was positioned far from the NAFION surface, the expansion effect was appreciable.

Infrared absorption in water causes a temperature elevation. To measure local temperatures, an OMEGAETTE 1M datalogger thermometer HH306 was used, with stainless-steel-sheathed, compact transition ground-junction probe (TJC36 series), small enough (250 µm) to fit within the exclusion zone. (OMEGAETTE® is a registered trademark of Omega Engineering, Inc., of Stamford, Conn.) With the incident beam positioned to elicit the maximum expansion, i.e., centered 175 µm from the NAFION surface, the measured temperature increases are shown in Table 1.

TABLE 1

| Temperature increases measured at different distances from the NAFION surface after 10 min. exposure to 3.1 µm radiation (n = 3) | |
| --- | --- |
| Distance | Mean temperature increase |
| 175 µm | 1.1° C. |
| 250 µm | 0.91° C. |
| 350 µm | 0.92° C. |
| 4 mm | 0.91° C. |
| 6 mm | 0.92° C. |

Radiation-induced temperature increases were modest at all positions and fairly uniform over the chamber. Slight temperature variation was found with depth, implying that the thermal mass of the probe itself, immersed by varying extents for measurements at varying depths, did not introduce any serious artifact.

Dynamics of temperature rise were observed. The temperature increase occurred steadily, reaching a plateau of about 1° C. at 10-15 min after turn-on. This plateau was attained at a time that the exclusion zone continued to expand (see FIG. 8A). Not only was the temperature increase modest, but also the time course of temperature rise and exclusion zone expansion were not correlated.

Infrared effects were seen at depths on the millimeter scale, whereas infrared penetration into water is anticipated to extend down only on the micrometer scale. One possible explanation is that penetration through the exclusion zone is deeper than through bulk water.

The exclusion zone expansion's spectral sensitivity was determined. The experimental setup was similar to that described above. The about 200 µm wide light beam emerging from the pinhole was directed to the middle of exclusion zone, and expansion was measured 300 µm below solution surface.

For the UV and visible sources, maintaining consistent optical power output at all wavelengths was achievable within +/−10% by adjusting the driver current. IR sources were considerably weaker and output power was maintained at a lower level, three orders of magnitude lower than in the UV-visible ranges.

For ultraviolet and visible ranges all incident wavelengths brought appreciable expansion (FIG. 2A). The degree of expansion increased with increasing wavelength, the exception being the data point at 270 nm, which was higher than the local minimum at 300 nm. The higher absorption may reflect the signature absorption peak at 270 nm characteristic of the exclusion zone. Clear wavelength sensitivity was also found in the infrared region, the most profound expansion occurring at 3.1 µm (FIG. 2B). Recognizing that the optical power available for use in the IR region was 1/600 of that in the visible and UV regions, one can assume that with comparable power, the IR curve would shift considerably upward continuing the upward trend evident in FIG. 2A. The most profound effect is in the IR region, particularly at 3.1 µm.

Interestingly, the overall spectral sensitivity of expansion follows closely the spectral sensitivity of water absorption. In both cases, there is an overall minimum in the near-UV, plus a local maximum at 2.0 µm and a peak at 3.1 µm. If not by coincidence, then a connection is implied between IR absorption and EZ expansion, although the linkage is apparently not through temperature increase, which was both modest and temporally uncorrelated. Furthermore, increasing the bath temperature actually diminishes exclusion zone size. Evidence that the effect is apparently non-thermal.

FIGS. 10A and 10B present evidence that negative charge buildup next to NAFION is associated with proton buildup in the bulk water beyond. FIG. 10A shows the bulk-water pH transient that occurs during exclusion zone buildup, while FIG. 10B shows the pH distribution in the bulk measured after the exclusion zone had formed. Whereas the exclusion zone is negatively charged, both results, using independent techniques, confirm that the region beyond contains an abundance of protons. Indeed, electrodes placed in the respective zones are able to deliver substantial current to a load confirming charge separation between the exclusion zone and the bulk zone beyond.

FIG. 11 is a graph comparing potential (mV) measured as a function of distance from the surface of representative hydrophilic materials (NAFION and poly(acrylic acid) gel) useful in the method of the invention; the substances are depicted as "inside" and water is "outside." Similar negative potentials have been observed with ion-exchange beads composed of crosslinked polystyrene divinylbenzene backbones functionalized with sulfonic acid groups.

The following is a description of the methods used in the experiments describe above.

Sample Preparation.

NAFION surfaces, sheets or tubes, were used for creating exclusion zones. NAFION was immersed in ultrapure water (NANOpure Diamond [trade] 1M p=18.2 MΩ-cm) to which microspheres were added for delineating the exclusion zone boundary. To supply incident energy, a series of LEDs were used. All experiments were carried out at room temperature in a darkened room.

Light Sources and Calibration. The LEDs used for infrared illumination (available from Gist Optics Co., LTD. of Chang-Chun, China) came in T0-18 packages with parabolic reflectors for reducing beam-divergence angle. For the visible range, the LED φ 5 series (available from NICHIA Corporation of Tokushima, Japan) was used. For illumination in the UV region, LED model NSHU590 (NICHIA) emitting at 365 nm, and LED models UVTOP® 265 and UVTOP® 295 (available from SENSOR ELECTRONIC TECHNOLOGY, Inc. of Columbia, S.C.) encapsulated in metal-glass T0-39 packages with UV-transparent hemispherical lens optical windows, emitting, respectively, at 270 nm and 300 nm, were used. All LEDs were driven at 2 kHz by a Model D-31 LED driver (available from Gist Optics Co., LTD. of ChangChun, China). Output power was regulated for consistency using a model 1815-C optical power meter (available from NEWPORT Corporation of Irvine, Calif.) equipped with NEWPORT model 818-UV, 818-SL and 818-IR probes.

In another aspect, the invention provides a method for generating electrical energy from a volume of water through the formation of an exclusion zone at the interface of air and water. In one embodiment of the method, energy is applied to a volume of water contained in a vessel to provide an exclusion zone in the volume of water at the air-water interface and a bulk zone in the volume of water outside of the exclusion zone; a first electrode is provided in the exclusion zone and a second electrode in the bulk zone; and electrical energy is extracted from the volume of water by connecting a load across the electrodes.

Exclusion zones have been observed not only next to hydrophilic surfaces as described above, but also at the air-water interface of volumes of water contained in vessel having a surface (upper surface) exposed to air. These exclusion zones (i.e., top layer of water on the order of 1 mm) appear to be solute free. In several chamber-geometrical variants, microspheres were consistently excluded from this zone and measurements showed that the zone had a negative potential.

It is possible that the air is not per se that was responsible for the presence of the exclusion zone and that the exclusion zone was due to the glass surfaces at the chamber's edge. At the glass-water interface the meniscus rise was commonly solute-free, implying the presence of structure. This structure apparently propagates along the water-air interface, covering the water surface. In narrow chambers this cover was commonly 1-2 mm thick, whereas in wider chambers, where the menisci are more widely separated, the structure was thinner. However, replacing air with nitrogen, but not oxygen, diminishes the exclusion zone implying that oxygen may be playing an important role.

An array of thin glass sheets, positioned parallel to one another and spaced about 1 mm apart, was constructed. The surfaces were oriented perpendicular to the air-water interface, and the top of the array lay immediately beneath the water surface. The negative electrode consisted initially of platinum wires running along the top edge of each member of the glass array, situated just at the air-water interface. The positive electrode, placed at a selectable distance beneath the array, was a platinum mesh.

Electrical power was extracted from these conditions, just as in the presence of hydrophilic surfaces described above. The drop of voltage, from the initial value to the plateau, was typically only 30-35%, a more modest drop than the situation with immersed hydrophilic surface. Thus, ambient energy could apparently better sustain the power delivery. Absolute power levels were higher. With hydrophilic surface (e.g., NAFION) systems, 1 μA currents with 10K resistor were obtained, while in this aspect, even with the higher resistance 200K resistor used for these experiments, currents on the order of several μA to 10 μA were obtainable, giving power levels in the range roughly 1 μW/cm$^2$ of surface (i.e., surface parallel to the air-water interface).

The effect of incident IR was found to be more consistent albeit less dramatic than in the hydrophilic surface (e.g., NAFION) systems. When IR light was applied from the onset, the drop-off of voltage was slowed by about five or six times; and, the plateau level remained somewhat higher. When the IR was turned on sometime during the plateau, the effect was smaller, sometimes being insignificant, other times causing a slight increase.

Several experimental variants were evaluated including the use of different types of electrode materials instead of platinum and the addition of salts into the pure water.

Regarding electrode materials, various combinations of platinum, zinc, aluminum and copper were explored. Depending on the combination, the voltages were either higher or lower than with platinum-platinum. In one advantageous embodiment, the electrode combination was platinum (negative) and zinc (positive), which gave an initial potential difference on the order of about 1 V.

FIGS. 10A 12-15 are graphs demonstrating the effectiveness of generating electrical energy from an air-water interface as described above. FIG. 12 is a graph of voltage (V) over time using a platinum cathode and zinc electrode. FIG. 13 is a graph corresponding to FIG. 12 showing current (amperes) over time. FIG. 14 is a graph of voltage (V) over time using a platinum cathode and zinc electrode using glass slides that are twice (2×) larger than those used to obtain the record shown in FIG. 12 (note voltage increase). FIG. 15 is a graph corresponding to FIG. 14 showing current (amperes) over time. When using electrodes of two different metals, rather than the same metals for each electrode, some difference of output power may be due to the metals' electrochemical surface potentials.

Regarding the addition of salt, modest amounts of salt caused the potential difference to increase. To check the effect, the salt was added in low concentration during the voltage falloff. Voltage magnitude immediately increased, followed by a less steep falloff than in the absence of salt, by 0.2 to 0.3V.

While illustrative embodiments have been illustrated and described, it will be appreciated that various changes can be made therein without departing from the spirit and scope of the invention.

What is claimed:

1. A method for generating electrical energy by transforming energy in a volume of water, comprising:
    transforming radiant energy into electric current to create continuous energy transformation by:
    (a) contacting a volume of water with a hydrophilic surface and applying energy to the volume of water to provide an exclusion zone in the volume of water at the interface of the hydrophilic surface and the water, and a bulk zone in the volume of water outside of the exclusion zone;
    (b) providing a first electrode in the exclusion zone and a second electrode in the bulk zone; and
    (c) extracting electrical current from the volume of water by connecting an electrical circuit across the electrodes.

2. The method of claim 1, wherein applying energy comprises irradiating the volume of water with electromagnetic radiation.

3. The method of claim 2, wherein the electromagnetic radiation has a wavelength in the range from about 200 nm to about 10,000 nm.

4. The method of claim 2, wherein the electromagnetic radiation has a wavelength of about 3 micrometers.

5. The method of claim 2, wherein the electromagnetic radiation is radiant energy from the sun.

6. The method of claim 2, wherein the electromagnetic radiation is radiant energy from a local environment.

7. The method of claim 1, wherein the exclusion zone extends from about 1 nm to about 1 m from the hydrophilic surface.

8. The method of claim 1, wherein the hydrophilic surface is a net negatively charged surface.

9. The method of claim 1, wherein the hydrophilic surface is a net positively charged surface.

10. The method of claim 1, wherein the hydrophilic surface is a hydrophilic gel.

11. The method of claim 1, wherein the hydrophilic surface is a biological material.

12. The method of claim 1, wherein the hydrophilic surface is a self-assembled monolayer.

13. The method of claim 1, wherein the hydrophilic surface is a polymeric surface.

14. The method of claim 1, wherein the hydrophilic surface is an inorganic surface.

15. The method of claim 1, wherein the hydrophilic surface comprises a plurality of hydrophilic beads.

16. The method of claim 1, wherein the hydrophilic surface is ice.

17. The method of claim 1, wherein the water has a pH of from about 2 to about 11.

18. The method of claim 1, wherein the water further comprises a salt.

19. The method of claim 1 further comprising applying energy to the volume of water by applying a voltage across the electrodes.

20. A method for providing electrical energy by transforming energy in a volume of water, comprising:
    transforming radiant energy into electric current to create continuous energy transformation by connecting an electrical circuit across first and second electrodes in contact with a volume of charge-separated water,
    wherein the volume of water comprises a hydrophilic surface in liquid communication with the water defining an exclusion zone at an interface of the hydrophilic surface and the water, and a bulk zone in the volume of water outside of the exclusion zone,
    wherein the first electrode is in the exclusion zone, and wherein the second electrode is in the bulk zone.

21. A system for generating electrical energy by transforming energy in a volume of water, comprising:
    an apparatus to transform radiant energy into electric current to create continuous energy transformation, the apparatus further comprising:
    (a) a hydrophilic material having a hydrophilic surface;
    (b) a vessel for receiving the hydrophilic material and a volume of water;

(c) a first electrode positioned in the vessel proximate to the hydrophilic surface;

(d) a second electrode positioned in the vessel distal to the hydrophilic surface; and (e) an electrical circuit operatively coupled to the first and second electrodes.

22. The system of claim 21 further comprising the volume of water.

23. The system of claim 21, wherein the first electrode is positioned in an exclusion zone formed at the interface of the hydrophilic surface and the water.

24. The system of claim 23, wherein the second electrode is positioned in a bulk zone in the volume of water outside of the exclusion zone.

25. The method of claim 1, wherein the first and second electrodes are substantially the same materials.

26. The method of claim 1, wherein the first and second electrodes have differing reduction potentials.

27. The method of claim 26, wherein the first and second electrodes are zinc and platinum, respectively.

28. The system of claim 21, wherein the first and second electrodes are made of substantially the same materials.

29. The system of claim 21, wherein the first and second electrodes have differing reduction potentials.

30. The system of claim 29, wherein the first and second electrodes are zinc and platinum, respectively.

\* \* \* \* \*